Mar. 27, 1923.
C. B. ALSPACH.
HOG FEEDER.
FILED APR. 15, 1921.
1,449,485.
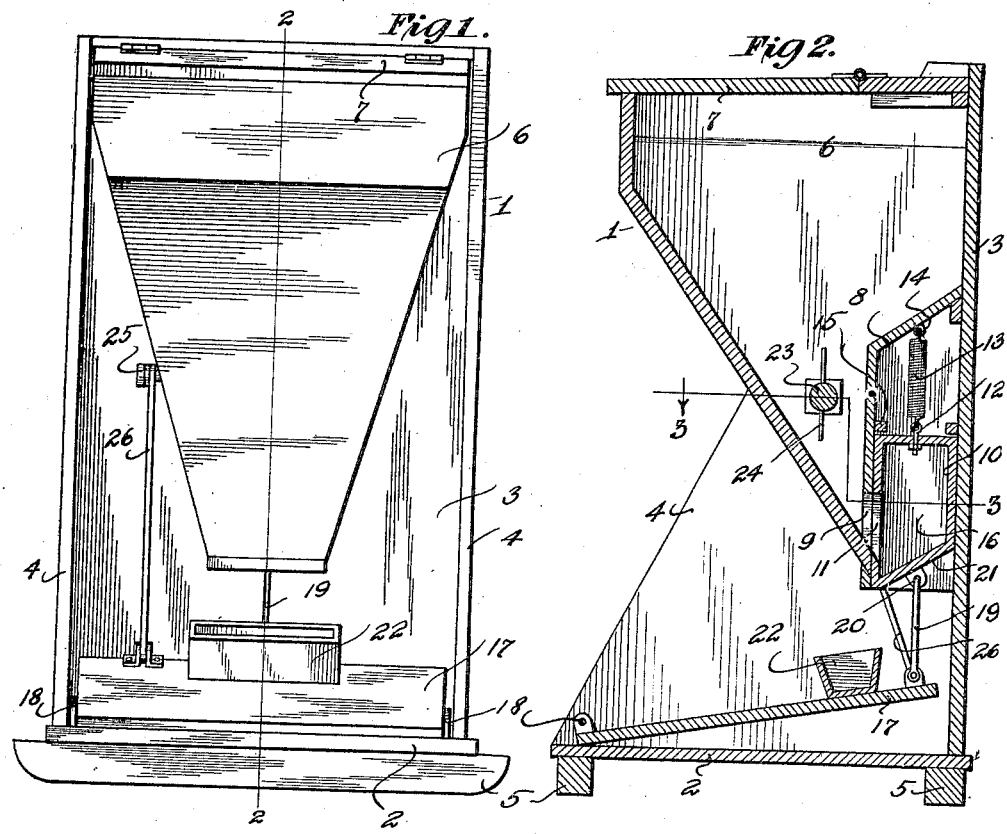
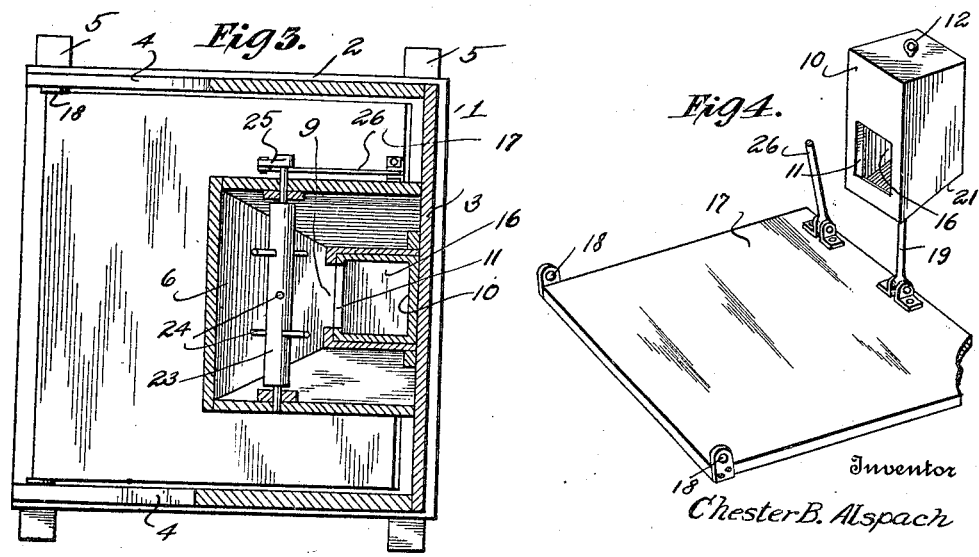
Inventor
Chester B. Alspach
By C. C. Shepherd
Attorney Patented Mar. 27, 1923.

1,449,485

UNITED STATES PATENT OFFICE.

CHESTER B. ALSPACH, OF CANAL WINCHESTER, OHIO.

HOG FEEDER.

Application filed April 15, 1921. Serial No. 461,510.

*To all whom it may concern:*

Be it known that CHESTER B. ALSPACH, a citizen of the United States, residing at Canal Winchester, in the county of Franklin and State of Ohio, has invented certain new and useful Improvements in Hog Feeders, of which the following is a specification.

This invention relates to hog feeders, and has for its object the provision of a structure of this nature wherein an improved mechanism is provided for automatically effecting the delivery of the feed material from the hopper thereof into the trough structure, and to permit this object to be accomplished in such manner that waste of material will be avoided.

In carrying out the invention, there is employed a hog-feeder which consists of a frame having a hopper formed therewith for receiving the feed material, the bottom of said hopper being formed to include a discharge opening capable of registering normally with a similar opening provided in a vertically movable valve member, the latter in turn being movably connected with an oscillatory trough carrying platform and with an elevating spring, the arrangement being such that when the animal treads upon the platform, the valve member will be lowered so as to close the discharge opening in the bottom of the hopper so as to arrest further flow of such material, and to bring the opening of the valve member into discharging relation with the platform carried trough, thus permitting said trough to be filled with material discharged from the valve member, a feature of construction which will serve to supply a feeding animal at any given operation with a graduated amount of the feed material, and in this manner to prevent an undue waste of the material within the hopper structure.

With these and other objects in view, as will appear as the description proceeds, the invention accordingly consists in the novel features of construction, combinations of elements and arrangements of parts, hereinafter to be fully described and pointed out in the appended claim.

In the drawing:

Figure 1 is a front elevation of the improved hog feeder comprising the present invention, Figure 2 is a vertical sectional view taken therethrough on the line 2—2 of Figure 1, Figure 3 is a horizontal sectional view taken on the line 3—3 of Figure 2, and Figure 4 is a detail perspective view of the movable platform and the associated valve structure.

Referring more particularly to the specific construction of the form of hog feeder set forth in the accompanying drawing, the numeral 1 designates the frame thereof in its entirety. This frame is formed to include a suitable base 2, which embodies a vertically upstanding rear wall 3 and substantially triangular side walls 4, the latter being employed to unite the edges of the wall 3 with the base 2 and to generally strengthen the construction of the frame. The under side of the base may be equipped if desired with runners 5 which facilitate the transportation of the feeder.

The frame 1 has its wall 3 formed to provide a hopper 6 into which the feed material in any suitable quantity may be deposited, the top of said hopper being provided with a hinge lid 7, and the walls of said hopper are suitably inclined, as shown, so that the feed material will gravitate toward the restricted lower end of the hopper. Within the lower end of the hopper there is provided a casing 8, which has its vertical wall formed to include an opening 9, through which the feed material may be discharged from the hopper in a regulated manner by mechanism hereinafter to be more fully described.

The casing 9 is formed to include a vertically reciprocable delivery or valve member 10 which is adapted to control the flow of feed material from the hopper. As shown, the said delivery member is of hollow construction and has its forward wall formed to include an opening 11, which is situated to normally register with the opening 9 provided in the casing 8. The top of the delivery member is provided with an eye 12, to which is fixed the lower end of a coil spring 13. The upper end of this spring is suitably connected with an eye 14 arranged to be rigidly secured in connection with the top of the casing 8. By this construction it will be apparent that the spring will normally serve to elevate the said delivery or valve member and to maintain registration between the openings 9 and 11, a suitable stop means 15 is provided within the casing 8 to limit the upward movement of the delivery member, and to thus insure proper registration between said openings. Therefore, by reason of the relative arrangement of the openings, it will be manifest that material within the hopper will, by the action of gravity, fall downwardly into the lower restricted portions of the hopper, and thence through the openings 9 and 11 and into the hollow delivery or valve member 10, filling the chamber 16 formed therein with a suitable amount of such material.

The base 2 is provided with a pivoted platform 17, which has its outer edge pivoted or hinged as at 18 contiguous to the outer edge of the base 2, while the rear edge of said platform is provided with a pivoted upwardly extending link 19 which, in turn, has its upper end pivoted or hinged as at 20 to the inclined bottom 21 of the member 10. It will be observed that by directly connecting the free or inner edge of the platform with the member 10, the said platform will be maintained normally in an inclined position with respect to the base 2, by the action of the spring 13. However, when the animal to be fed treads upon the platform, the pressure exercised on the latter will be sufficient to cause the same to move or swing downwardly, against the tension exercised by the spring 13. This downward movement on the part of the platform causes the delivery member to be moved downwardly in unison therewith, a feature of construction which results in causing the upper part of the front wall of said delivery member to close the discharge opening 9 in the bottom of the hopper 6, thus preventing a further outflow of the feed material from the hopper. However, the downward movement of the delivery member is of such extent that its discharge opening 11 will be brought to a position below the lower edge of the hopper, thus permitting the feeding material, confined within the chamber 16 of said delivery member to be discharged from the latter by gravity upon the platform 17 or, if desired, into the trough 22 carried by said platform. Thus, the capacity of the delivery member will serve to regulate the quantity of the feeding material which will be delivered to an animal upon each operation of the feeder, and a construction is therefore provided in which the amount of material discharged from the feeder may be definitely regulated so that over-feeding on the part of the animals, and consequent waste of the material, will be precluded. It will be apparent that when the weight of an animal is removed from the platform, the latter and the delivery member will be returned to a normal position by the action of the spring 13, thus permitting said delivery member to be again refilled with material from the hopper. It will be understood that the inclined bottom of the delivery member will be terminated so that the material will be directly discharged into the trough 22.

To prevent undue clogging of the feeding material within the restricted throat portion of the hopper, there is provided an agitator which consists of a horizontally journaled rod 23, carrying spaced fingers or tines 24, which are adapted to be oscillated to agitate the material to cause the same to flow freely. The rod 23 may be oscillated by providing the outer end of the same with a crank 25, which may be connected by means of a link 26 with the free end of the platform 17. Obviously, the movement of the platform will serve to oscillate the agitator in the prescribed manner.

In view of the foregoing description, taken in conjunction with the accompanying drawing, it will be apparent that the present invention provides a hog feeder of simple, substantial and durable construction and one wherein improved features of construction are provided for effecting a regulated delivery of the feeding material when properly actuated. The construction serves to provide an animal with a necessary amount of such feeding material, but effectually prevents an overdelivery of said material and consequent waste thereof, and it is mainly in this respect that the present invention is believed to constitute an improvement upon the structures of the prior art.

What is claimed is:

In a hog feeder, a frame including a base and upstanding supports, a hopper structure connected with said supports and including a relatively restricted outlet, a substantially hollow slidably mounted delivery member, the outlet of the hopper and discharge opening of the delivery member being directed in opposite directions, spring means normally serving to maintain said delivery member in registration with said outlet, whereby the interior of said delivery member may be filled with material discharged from said hopper, and a movable platform connected with said delivery member and operable upon the application of pressure thereto to move said delivery member to a discharging position and to simultaneously obstruct the flow of material from the outlet of said hopper structure.

In testimony whereof I affix my signature.

CHESTER B. ALSPACH.